US011067683B2

(12) United States Patent
Trivelpiece et al.

(10) Patent No.: US 11,067,683 B2
(45) Date of Patent: Jul. 20, 2021

(54) SYSTEMS AND METHODS FOR LOCATING ITEMS WITHIN A FACILITY

(71) Applicants: Steve E. Trivelpiece, Rancho Santa Margarita, CA (US); Ned McCauley, Atlanta, GA (US); Eric F. Riggert, Trabuco Canyon, CA (US)

(72) Inventors: Steve E. Trivelpiece, Rancho Santa Margarita, CA (US); Ned McCauley, Atlanta, GA (US); Eric F. Riggert, Trabuco Canyon, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 372 days.

(21) Appl. No.: 16/325,576

(22) PCT Filed: Aug. 15, 2017

(86) PCT No.: PCT/US2017/046932
§ 371 (c)(1),
(2) Date: Feb. 14, 2019

(87) PCT Pub. No.: WO2018/038970
PCT Pub. Date: Mar. 1, 2018

(65) Prior Publication Data
US 2019/0179003 A1    Jun. 13, 2019

Related U.S. Application Data

(60) Provisional application No. 62/378,368, filed on Aug. 23, 2016.

(51) Int. Cl.
*G06K 7/10* (2006.01)
*G01S 13/75* (2006.01)
(Continued)

(52) U.S. Cl.
CPC .......... *G01S 13/75* (2013.01); *G06K 7/10386* (2013.01); *G06K 7/10475* (2013.01); *H04W 4/029* (2018.02); *H04W 4/80* (2018.02)

(58) Field of Classification Search
CPC ......... G01S 13/75; H04W 4/029; H04W 4/80; G06K 7/10386; G06K 7/10475
See application file for complete search history.

(56) References Cited

U.S. PATENT DOCUMENTS 7,706,765 B2 * 4/2010 Collins ................. H04L 12/413
455/229
2002/0111819 A1 8/2002 Li et al.
(Continued)

OTHER PUBLICATIONS

International Search Report and Written Opinion dated Jan. 31, 2018 for PCT/US2017/046932.

*Primary Examiner* — Munear T Akki
(74) *Attorney, Agent, or Firm* — Arent Fox, LLP

(57) ABSTRACT

Systems and methods for finding tags which are unreadable at a particular time. The methods comprise: performing first operations by a first mobile tag reader to read tags at a first time and to determine physical locations of the tags which were read at the first time; and performing second operations by the first mobile tag reader or a second mobile tag reader at a second later time for determining a first geographic area in which a first tag which is unreadable resides. The second operations comprise: analyzing tag read data associated with the first operations to identify second tags which were read along with the first tag on a previous occasion; and selecting the first geographic area to comprise a second geographic area defined by the physical locations of the second tags which were determined during the first operations by the first mobile tag reader.

19 Claims, 8 Drawing Sheets

(51) Int. Cl.
*H04W 4/029* (2018.01)
*H04W 4/80* (2018.01)

(56) References Cited

U.S. PATENT DOCUMENTS

| | | | | |
|---|---|---|---|---|
| 2005/0274799 | A1* | 12/2005 | Torchalski | H04B 5/0068 235/432 |
| 2006/0197652 | A1* | 9/2006 | Hild | G06K 19/0701 340/10.2 |
| 2006/0214773 | A1* | 9/2006 | Wagner | G06K 7/10079 340/10.2 |
| 2006/0267730 | A1* | 11/2006 | Steinke | G06K 7/0004 340/10.1 |
| 2007/0273481 | A1* | 11/2007 | Soleimani | H01Q 1/2225 340/10.1 |
| 2008/0042803 | A1* | 2/2008 | Posamentier | G06K 19/0716 340/10.1 |
| 2008/0080197 | A1* | 4/2008 | Heine | B64D 11/00 362/471 |
| 2008/0100439 | A1* | 5/2008 | Rinkes | G06K 7/10217 340/572.1 |
| 2008/0100450 | A1* | 5/2008 | Ayyagari | B64D 25/18 340/572.7 |
| 2008/0111661 | A1* | 5/2008 | Lin | G06K 7/0008 340/10.1 |
| 2008/0231449 | A1* | 9/2008 | Moshfeghi | G08C 17/02 340/572.1 |
| 2008/0278292 | A1* | 11/2008 | Nierenberg | G08C 21/00 340/10.3 |
| 2009/0002176 | A1* | 1/2009 | Bekritstky | G06K 19/0707 340/572.7 |
| 2012/0223817 | A1* | 9/2012 | Hansen | G06K 7/10039 340/10.33 |
| 2013/0222119 | A1* | 8/2013 | Tietke | G06K 19/0701 340/10.5 |
| 2015/0084746 | A1* | 3/2015 | Jones | G06K 7/10009 340/10.32 |

\* cited by examiner

SYSTEMS AND METHODS FOR LOCATING ITEMS WITHIN A FACILITY

CROSS REFERENCE TO RELATED APPLICATION

The present application claims the benefit of International Patent Application (PCT) No. PCT/US2017/046932 filed on Aug. 15, 2017, which claims priority to U.S. Provisional Application Ser. No. 62/378,368 filed on Aug. 23, 2016. Both of the aforementioned applications are incorporated herein by reference in their entireties.

FIELD

This document relates generally to wireless based systems. More particularly, this document relates to systems and methods for locating and/or determining the orientations of items within a facility using various technologies (e.g., Radio Frequency Identifier ("RFID") technology, compass technology, proximity sensor technology, accelerometer technology, gyroscope technology, and/or photoelectric sensor technology).

BACKGROUND

RFID technology has conventionally been used in the identification and tracking of products, equipment, and even people. For example, RFID systems are commonly used in Electronic Article Surveillance ("EAS") and in logistical and inventory systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The RFID technology allows retailers to rapidly and/or continuously identify products, count products and track product locations. As such, the RFID technology offers significant benefits over a physical inventory counting process. By leveraging the RFID technology to increase inventory accuracy, retailers are better able to perform replenishment, service customer requests, manage product recalls or any other activities that rely on inventory data. With this level of inventory visibility, retailers must also take on the additional burden of being able to locate specific products easily and quickly so that they can service the above-listed use cases. Products on the market today to aid in determining a product's location are either too expensive or not accurate enough to serve this need.

SUMMARY

The present disclosure concerns implementing systems and methods for finding tags of a plurality of tags (e.g., RFID tags) which are unreadable by a mobile tag reader (e.g., a handheld tag reader) at a particular time. The methods comprise performing first operations by a first mobile tag reader to read tags at a first time and to determine physical locations of the tags which were read at the first time. At a second later time, the first mobile tag reader or a second mobile tag reader performs second operations for determining a first geographic area in which a first tag of the plurality of tags which is unreadable by a mobile tag reader resides. The second operations comprise: analyzing tag read data associated with the first operations to identify second tags of the plurality of tags which were read along with the first tag on a previous occasion; and selecting the first geographic area to comprise a second geographic area defined by the physical locations of the second tags which were determined during the first operations by the first mobile tag reader.

In some scenarios, the physical locations of the tags are determined based on at least one of a physical location, a pointing direction and a transmit power of the first mobile tag reader at the time of performing the first operations. The transmit power of the first mobile tag reader may be adjusted prior to performing the first operations based on a physical location of the first mobile tag reader.

In those or other scenarios, an indication is output from the first or second mobile tag reader which indicates where the first geographic area is relative to the current location of the first or second mobile tag reader. The indication includes, but is not limited to, a Geiger counter indication and/or a map showing where the first geographic area is relative to the current location of the first or second mobile tag reader in a visual 3D space. The first or second mobile tag reader is moved into the first geographic area using the indication. The first tag is visually found by an individual using the first or second mobile tag reader, automatically visually found by the first or second mobile tag reader having an image capture and processing capability, or automatically found by the first or second mobile tag reader via tag read operations.

In those or yet other scenarios, the first and/or second mobile tag reader is configured to auto-map locations of fixed infrastructure equipment. The auto-mapped locations of the fixed infrastructure equipment are used to locate a second tag of the plurality of tags which are unreadable by the mobile tag reader. The second tag is located by identifying a piece of fixed infrastructure equipment that last read the second tag or was read at the same time as the second tag on a prior occasion.

DESCRIPTION OF THE DRAWINGS

The present solution will be described with reference to the following drawing figures, in which like numerals represent like items throughout the figure.

DETAILED DESCRIPTION

Figure 1:
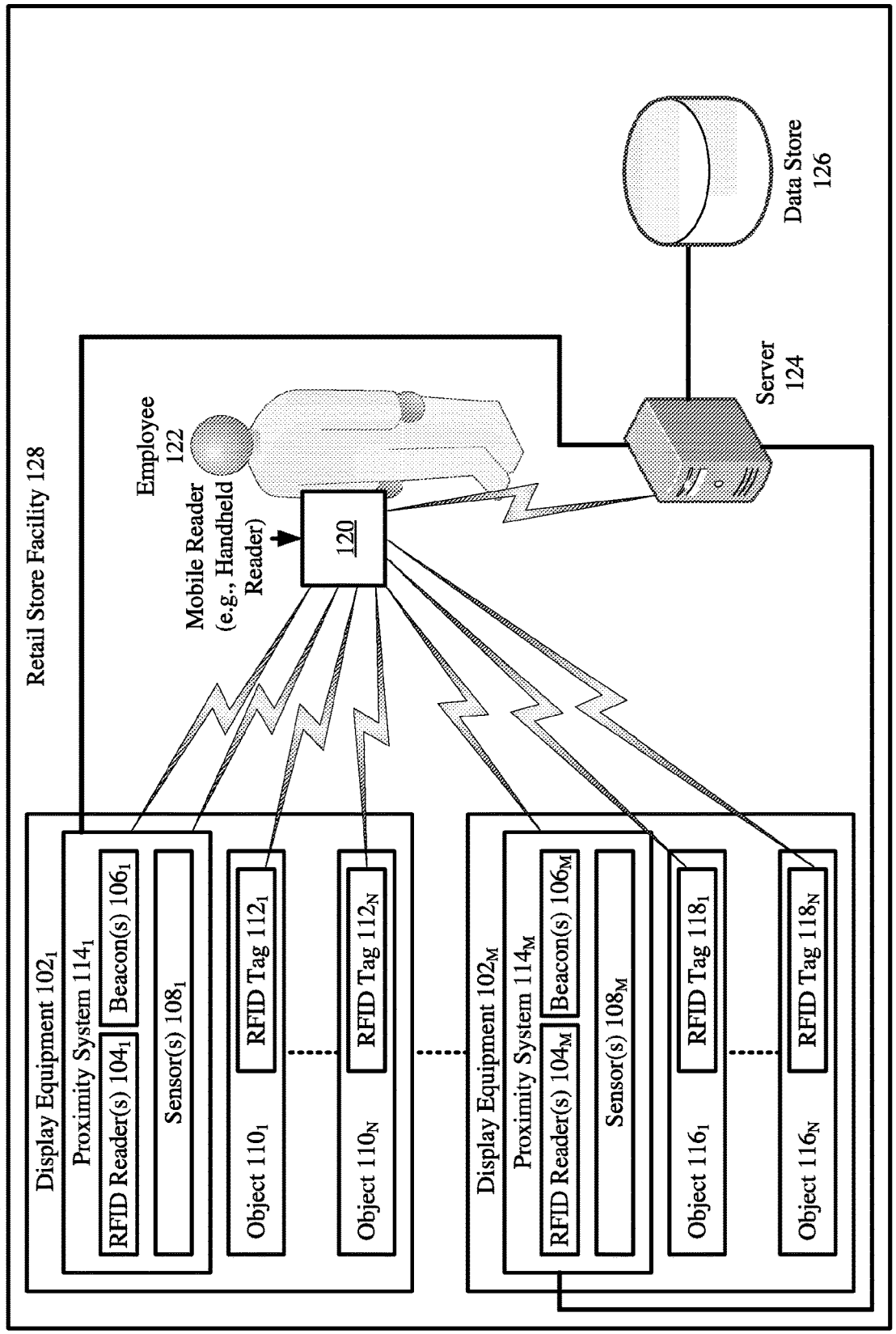
FIG. 1 is a schematic illustration of an illustrative system.

It will be readily understood that the components of the present solution as generally described herein and illustrated in the appended figures could be arranged and designed in a wide variety of different configurations. Thus, the following more detailed description of the present solution, as represented in the figures, is not intended to limit the scope of the present disclosure, but is merely representative of various implementations. While the various aspects of the the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns systems and methods for determining the locations of RFID tags which are unreadable by a mobile RFID reader. The mobile RFID reader is carried by or coupled to equipment and/or individuals moving around a facility. For example, the mobile RFID reader is coupled to shopping carts, cleaning equipment and store employees. Alternatively, the mobile RFID readers comprise handheld RFID readers carried by the store employees.

The methods involve: reading RFID tags at a first time; determining the physical locations of the RFID tags based on the physical location, pointing direction and/or transmit power of the mobile RFID reader at the time of the tag reads; storing timestamped information specifying the physical locations of the RFID tags; generating a map showing the physical locations of RFID tags; and using the timestamped information at a later time to guide a user of the mobile RFID reader to the general vicinity in which an unreadable one of the RFID tags likely resides. The pointing direction and/or transmit power facilitates the generation of the map showing the physical locations of RFID tags present within a facility (such as a retail store facility) with a fine level of accuracy (e.g., ≤1-20 feet).

For example, the mobile RFID reader is used to read ten RFID tags disposed within a facility during a first business day. The first physical locations of the ten RFID tags is determined based on the mobile RFID reader's physical location at the time of the RFID tag reads, and stored in a datastore along with a timestamp. Subsequently, the ten RFID tags are moved. During a second business day, the mobile RFID reader is used to find a first RFID tag of the ten RFID tags within the facility. However, the first RFID tag is positioned such that it is unable to be read by the mobile RFID tag reader which currently resides a certain distance therefrom. Still, the mobile handheld reader is able to direct the user to the general vicinity in which the first RFID tag resides. In this regard, the mobile RFID reader analyzes the tag read data from the first business day to determine the identifiers associated with the other nine RFID tags which were read at the same time as the first RFID tag. This information is then used to guide the mobile RFID reader towards the other nine RFID tags (e.g., via a Geiger counter visual/auditory output). Once the mobile RFID reader is a certain distance from the first RFID tag, the user may visually locate the same and/or the first RFID tag becomes readable by the mobile RFID reader (e.g., the RFID tag being sought is sitting against metal, and therefore is only readable by a reader located a few inches away). This process results in a significant reduction of time for finding RFID tags which are hidden and/or relocated.

In some scenarios, the physical location of the mobile RFID reader is dynamically determined (a) in accordance with a triangulation algorithm using signaling information received from beacons and/or other wireless network devices disposed within the facility, (b) using encoded location data received from fixed infrastructure equipment (e.g., fixed RFID tags) disposed within the facility, and/or (c) using location information generated by a highly accurate location capability thereof (e.g., a Global Positioning System ("GPS") capability). The present solution is not limited to techniques (a)-(c) for determining the mobile RFID reader's physical location. Other techniques can be used herein without limitation.

Power levels of the mobile RFID readers may be varied based on their determined locations. For example, a mobile RFID reader's physical location is considered to be relatively accurate. As such, the physical location of the mobile RFID reader is used to automatically select rules from a plurality of pre-defined rules and/or logic algorithms from a plurality of pre-defined logic algorithms for providing power optimization. In this regard, geographic zones may be defined within a facility. Each geographic zones is associated with different rules and/or logic algorithms. For example, if a mobile RFID reader is near a wall that is adjacent to a stock room filled with RFID tags or adjacent to a competing store employing different RFID tags, then the mobile RFID reader can automatically lower its transmit power so that the RFID tags in the adjacent room are not read thereby. Additionally, a mobile RFID reader could use this information to limit reading of RFID tags in certain areas. The mobile RFID reader could lower its transmit power in areas where one (1) foot accuracy is needed instead of a ten (10) foot accuracy.

The present solution also concerns systems and methods for auto-mapping locations of fixed infrastructure equipment. Such systems are less costly and simpler to install, as well as less prone to human errors. The fixed infrastructure equipment can include, but is not limited to, fixed RFID readers, fixed reference tags, beacons, and/or sensors (e.g., proximity sensors). The auto-mapping is achieved by: reading a first plurality of RFID tags by a mobile RFID reader; reading a second plurality of RFID tags by a fixed RFID reader; comparing first identifiers associated with the first plurality of RFID tags read by the mobile RFID reader and second identifiers associated with the second plurality of RFID tags; determining if a certain percentage of the first and second identifiers match each other; determining that the physical location of the fixed RFID reader is the same as or similar to the physical location of the mobile RFID reader; storing information specifying the determined physical location of the fixed RFID reader in a datastore; and/or generating a map showing the relative physical locations of the mobile RFID reader, the fixed RFID reader and/or other fixed infrastructure equipment.

The auto-mapped locations of the fixed infrastructure equipment are then used during the RFID tag locating process. In this regard, the physical locations of the fixed infrastructure equipment is used to geo locate RFID tags which were not able to be read by the mobile RFID reader at a particular time. For example, the physical locations of RFID tags read by the fixed infrastructure RFID reader (and not by the mobile RFID reader) are determined using the previously determined physical location of the fixed infrastructure RFID reader.

Illustrative Systems

Referring now to FIG. 1, there is provided a schematic illustration of an illustrative system 100. The present solution is described herein in relation to a retail store environment. The present solution is not limited in this regard, and can be used in other environments. For example, the present solution can be used in distribution centers, factories and other commercial environments. Notably, the present solution can be employed in any environment in which electronic devices and/or objects need to be located and/or tracked.

The system 100 is generally configured to allow improved device and/or object locating within a facility using various types of communication and sensor technologies. As shown in FIG. 1, system 100 comprises a Retail Store Facility ("RSF") 128 in which display equipment $102_1, \ldots, 102_M$ is disposed. The display equipment is provided for displaying objects $110_1\text{-}110_N, 116_1\text{-}116_N$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

Proximity systems $114_1, \ldots, 114_M$ are located at strategic locations within the RSF 128. In some scenarios, the proximity systems are disposed on display equipment $102_1, \ldots, 102_M$, as shown in FIG. 1. Additionally or alternatively, the proximity systems $114_1, \ldots, 114_M$ are disposed on emergency equipment, checkout counters and/or EAS system equipment (e.g., pedestals near and entrance/exit of the RSF). The proximity systems are generally configured to facilitate a periodic or continuous determination of an accurate physical location and orientation of the mobile reader. The mobile reader is described here as comprising a handheld reader 120 being carried by an employee 122 through the RSF 128. The present solution is not limited in this regard. The handheld reader 120 will be described in detail below in relation to FIG. 3. Still, it should be understood that the handheld reader 120 is generally configured to read RFID tags $112_1, \ldots, 112_N, 118_1, \ldots, 118_N$.

The RFID tags $112_1\text{-}112_N, 118_1\text{-}118_N$ are respectively coupled to the objects $110_1\text{-}110_N, 116_1\text{-}116_N$. The RFID tags are described herein as comprising single-technology tags that are only RFID enabled. The present solution is not limited in this regard. The RFID tags can alternatively or additionally comprise dual-technology tags that have both EAS and RFID capabilities.

Each proximity system $114_1, \ldots, 114_M$ comprises at least one RFID reader $104_1, \ldots, 104_M$. RFID readers are well known in the art, and therefore will not be described herein. Still, it should be understood that the RFID readers are generally configured to read the RFID tags $112_1, \ldots, 112_N, 118_1, \ldots, 118_N$. The RFID readers have known omnidirectional or directional antenna patterns, and are arranged such that their antenna patterns do or do not overlap with each other. Information is stored in a data store 126 that specifies the known locations of the RFID readers in three dimensional space. This information can be stored in a memory internal to the handheld reader and/or in a remote data store 126 using a server 124. Server 124 will be described in more detail below in relation to FIG. 2.

After the RFID readers have been placed within the RSF, operations can be performed to determine the locations of the RFID tags relative thereto. In this regard, the RFID readers read the RFID tags, and communicate information to the data store 126 for storage therein. This information can include, but is not limited to, first unique identifiers of the RFID readers, second unique identifiers of RFID tags that were read by the RFID readers, and/or timestamps reflecting the times at the RFID tag reads. Each second unique identifier is stored in the data store 126 so as to be associated with the first unique identifier corresponding to the RFID reader that read the corresponding RFID tag. This information is then used to determine the locations of the RFID readers in three dimensional space. A three dimensional map can be generated showing the locations of the RFID readers and/or RFID tags in the three dimensional space. Notably, the RFID tag locations are relatively inaccurate at this point in time since all that is known is that the RFID tags reside within a FOV of the RFID readers, respectively. As such, further operations are performed to increase the accuracy of the RFID tag locations as will be described below.

The fixed RFID readers are also used to determine the location of the handheld reader 120 as it is being carried through the RSF 128 by the employee 122. This determination can be made based on Received Signal Strength Indicator ("RSSI") computations. RSSI computations are well known in the art, and therefore will not be described herein. Any known or to be known RSSI computation can be used herein without limitation.

RF beacons $106_1, \ldots, 106_M$ may also optionally be included with the proximity systems $114_1, \ldots, 114_M$. RF beacons are well known in the art, and therefore will not be described herein. The RF beacons are generally configured to communicate with the handheld reader 120 to facilitate the determination as to where the handheld reader 120 is within the RSF 128 at any given time.

Sensors $108_1, \ldots, 108_M$ may optionally be included with the proximity systems $114_1, \ldots, 114_M$. The sensors can include, but are not limited to, photoelectric sensors (e.g., beam break sensors) or other people counter sensing devices. These sensors can be used to determine a location of the employee 122 within the RSF to a relatively high degree of accuracy. Once the employee's location is known, various techniques can be employed using this start location to continuously or periodically determine the handheld reader's location as it is being carried through the facility by the employee.

Figure 2:
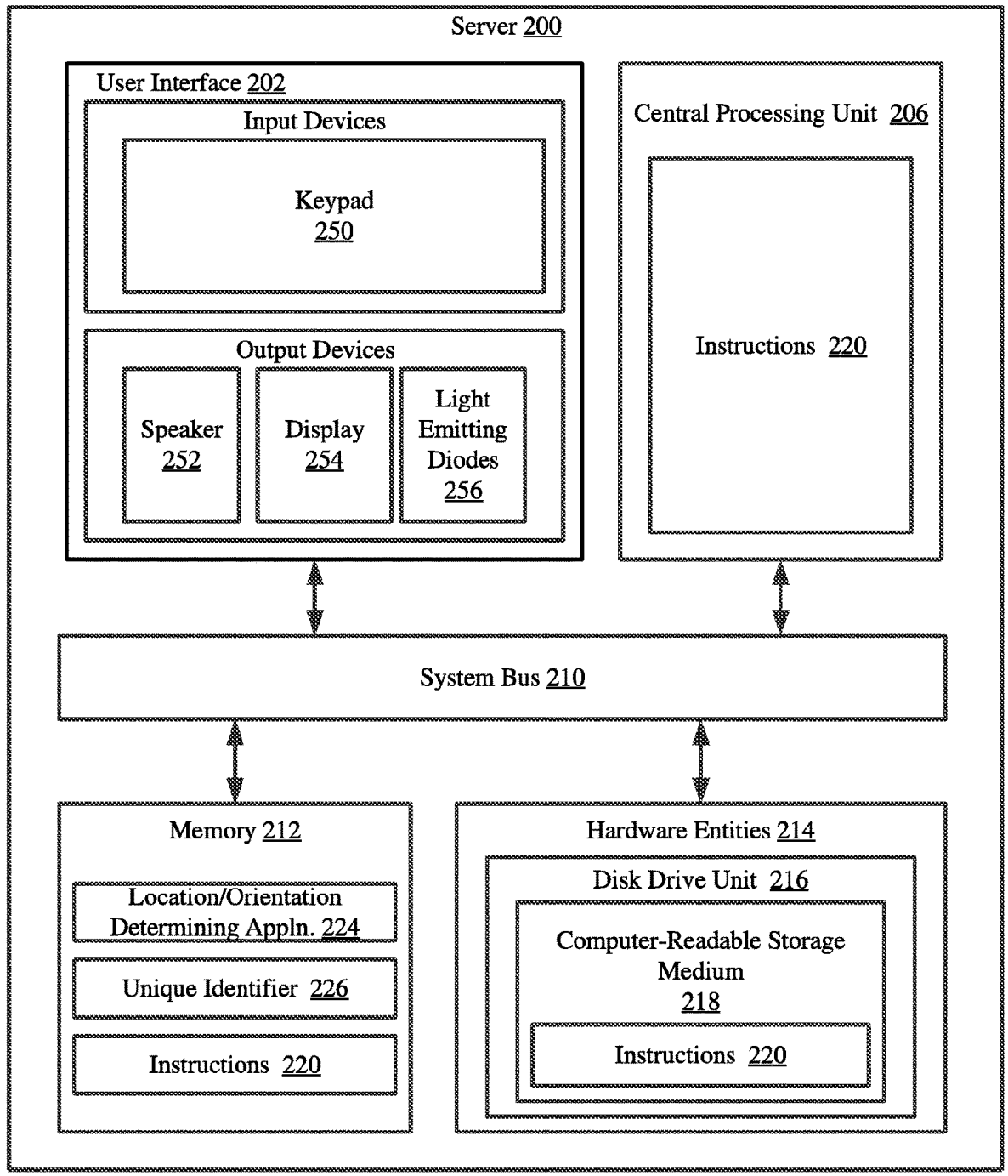
FIG. 2 is a block diagram of an illustrative architecture for a handheld reader.

Referring now to FIG. 2, there is provided a detailed block diagram of an illustrative architecture for a server 200. Server 124 of FIG. 1 is the same as or substantially similar to server 200. As such, the following discussion of server 200 is sufficient for understanding server 124.

Notably, the server 200 may include more or less components than those shown in FIG. 2. However, the components shown are sufficient to disclose an illustrative implementation of the present solution. The hardware architecture of FIG. 2 represents one illustrative architecture of a representative server configured to facilitate the provision of a three dimensional map showing highly accurate locations of RFID tags (e.g., RFID tags $112_1, \ldots, 112_N, 118_1, \ldots, 118_N$ of FIG. 1) and/or a handheld reader within an RSF (e.g., RSF 128 of FIG. 1). As such, the server 200 of FIG. 2 implements at least a portion of a method for providing such accurate locations. Some or all the components of the server 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the server 200 comprises a user interface 202, a Central Processing Unit ("CPU") 206, a system bus 210, a memory 212 connected to and accessible by other portions of server 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the server 200.

At least some of the hardware entities 214 perform actions involving access to and use of memory 212, which can be a Random Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the server 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the server 200 and that cause the server 200 to perform any one or more of the methodologies of the present disclosure.

In some scenarios of the present solution, the hardware entities 214 include an electronic circuit (e.g., a processor) programmed for facilitating the provision of a three dimensional map showing accurate locations of RFID tags and/or a handheld reader within a facility. In this regard, it should be understood that the electronic circuit can access and run a retail software application 224 installed on the server 200. The software application 224 is generally operative to facilitate: the determination of RFID tag locations within a facility; mapping of the RFID tag locations in a virtual three dimensional space; the determination of a handheld reader's location within the facility; mapping of the handheld reader's location in the virtual three dimensional space; the determination of the handheld reader's orientation; and/or the inclusion of an indication on the three dimensional map specifying the handheld reader's orientation. The map data can be processed by the server 200 and/or the external device to evaluate the relative locations of the handheld reader and the security tags. Other functions of the software application 224 will become apparent as the discussion progresses.

Figure 3:
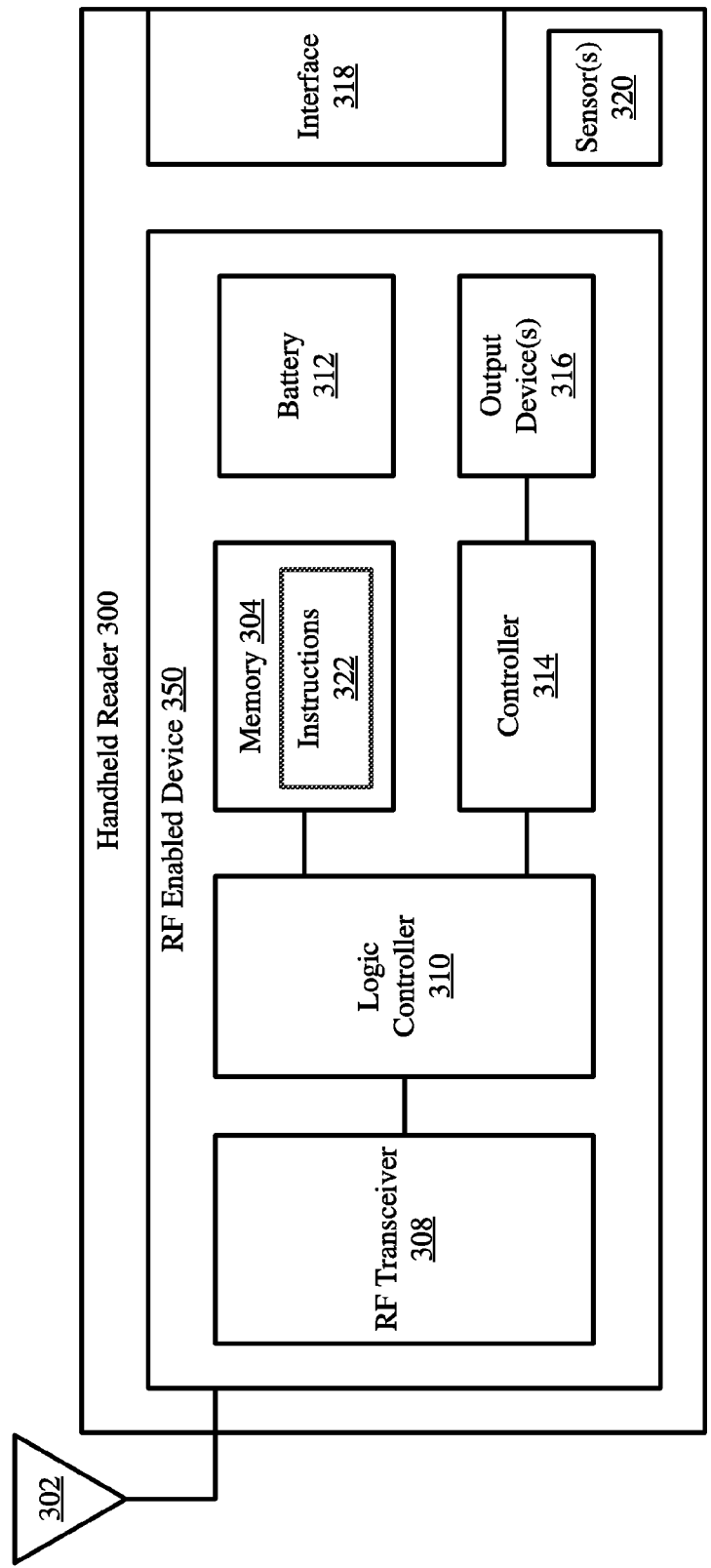
FIG. 3 is a block diagram of an illustrative architecture for a server.

Referring now to FIG. 3, there is provided a detailed block diagram of an illustrative architecture for a handheld reader 300. Handheld reader 120 of FIG. 1 is the same as or similar to handheld reader 300. As such, the discussion of handheld reader 300 is sufficient for understanding handheld reader 120.

Handheld reader 300 may include more or less components that that shown in FIG. 3. However, the components shown are sufficient to disclose an illustrative implementation of the present solution. Some or all of the components of the handheld reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustrative implementation of a representative handheld reader 300 configured to facilitate improved object locating within an RSF (e.g., RSF 128 of FIG. 1). In this regard, the handheld reader 300 comprises an RF enabled device 300 for allowing data to be exchanged with an external device (e.g., RFID readers $104_1, \ldots, 104_M$, RF beacons $106_1, \ldots, 106_M$, sensors $108_1, \ldots, 108_M$, and/or RFID tags $112_1, \ldots, 112_N, 118_1, \ldots, 118_N$ of FIG. 1) via RF technology. The components 304-316 shown in FIG. 3 may be collectively referred to herein as the RF enabled device 350, and include a power source 312 (e.g., a battery) and output devices 316. The output devices 316 include, but are not limited to, auditory output devices, visual output devices, and/or tactile output devices. For example, the output devices include a Geiger counter indicator. Geiger counter indicators are well known in the art, and therefore will not be described herein.

The RF enabled device 350 comprises an antenna 302 for allowing data to be exchanged with the external device via RF technology (e.g., RFID technology or other RF based technology). The external device may comprise RFID readers $104_1, \ldots, 104_M$, RFID beacons $106_1, \ldots, 106_M$, sensors $108_1, \ldots, 108_M$, and/or RFID tags $112_1, \ldots, 112_N, 118_1, \ldots, 118_N$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RFID transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the location of the handheld reader 300 within a facility (e.g., RSF 128 of FIG. 1) with a relatively high degree of accuracy. Accordingly, the logic controller 310 can store the extracted information in memory 304, and execute algorithms using the extracted information. For example, the logic controller 310 can perform RSSI algorithms and TOF algorithms to determine the location of the handheld reader 300 relative to external devices with known locations within the facility.

Notably, memory 304 may be a volatile memory and/or a non-volatile memory. For example, the memory 304 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The memory 304 on which is stored one or more sets of instructions 322 (e.g., software code) is configured to implement one or more of the methodologies, procedures, or functions described herein. The instructions 322 can also reside, completely or at least partially, within the memory 304 and/or within the logic controller 310 (e.g., a processor) during execution thereof by the handheld reader 300. The memory 304 and the logic controller 310 also can constitute machine-readable media. The term "machine-readable media", as used here, refers to a single medium or multiple media (e.g., a centralized or distributed database, and/or associated caches and servers) that store the one or more sets of instructions 322. The term "machine-readable media", as used here, also refers to any medium that is capable of storing, encoding or carrying a set of instructions 322 for execution by the handheld reader 300 and that cause the handheld reader 300 to perform any one or more of the methodologies of the present disclosure.

The instructions 322 are generally operative to facilitate: the determination of RFID tag locations within a facility; mapping of the RFID tag locations in a virtual three dimensional space; the determination of a handheld reader's location within the facility; and/or mapping of the handheld reader's location in the virtual three dimensional space. The map data can be processed by the RF enabled device 350 and/or an external device (e.g., server 124 of FIG. 1) to evaluate (1) the relative locations of the handheld reader and the security tags and/or (2) the relative locations of the handheld reader and other RF enabled devices (e.g., RFID readers and/or RF beacons of FIG. 1). Other functions of the RF enabled device 350 will become apparent as the discussion progresses.

Illustrative Methods

Given an environment with one or more handheld RFID readers which can determine their own physical location, RFID tags in the store are read by a handheld RFID reader and the tag's physical locations are determined based on the handheld RFID reader's physical location a the time of the tag read. In addition, to enhance the location information, the environment or facility may comprise fixed infrastructure equipment, for which the exact location of the readers/antennas thereof does not need to be physically mapped. Instead, when the fixed infrastructure equipment reads RFID tags including the ones already read by the handheld RFID reader(s), the fixed infrastructure equipment can determine the reading boundaries based on the physical locations already determined by the handheld RFID reader. RFID tags missed by the handheld RFID reader (or added later) can automatically be mapped to the same location as the RFID tags already in the system. Thus, based on the location data from the handheld RFID reader(s) and the corresponding RFID tags, the location of the fixed RFID reader(s) can be determined and mapped within a facility. Such a system is easier to build and deploy since the exact location of each fixed infrastructure equipment (e.g., fixed RFID reader(s)) would not need to be known ahead of time, but could be determined dynamically by the handheld RFID reader's tag reads. Alternatively, the various methods and systems can work equally well for RFID tags affixed to fixed items, such as furniture (location tags) as opposed to RFID tags affixed to merchandise (inventory tags).

The present solution also provided an enhanced Geiger counter method. A system may use handheld RFID readers to find RFID tags which have been 3D mapped. However, various RFID tags may be difficult to locate, for example, due to their proximity to an obstacle. The known Geiger counter functionality typically requires searches for a specific RFID tag and beeps when the specific RFID tag is in view. The frequency or volume of the output is typically used to identify the proximity of the handheld RFID reader to the specific RFID tag. This type of solution can be difficult to employ because it requires the user to be very close to the specific RFID tag (e.g., within a few 10s of feet) before it can work.

In contrast, the system of the present solution is configured to indicate proximity information even when the handheld RFID reader can't read the specific RFID tag in question based on the location data of the handheld RFID reader or the other RFID tags known to be near the specific RFID tag being sought. That is, the specific RFID tag being sought is associated with a location and that location has other RFID tags as well. If the handheld RFID reader can read those locations then the handheld RFID reader's Geiger counter functionality can indicate this as proximity information. According, even if the handheld RFID reader cannot read the specific RFID tag, the handheld RFID reader can still provide some kind of Geiger output (for example, based on facing in the right direction, or being able to read RFID tags that are in between it and the specific RFID tag). Of note, this functionality works even if the specific RFID tag is not in the correct location.

Figure 4A:
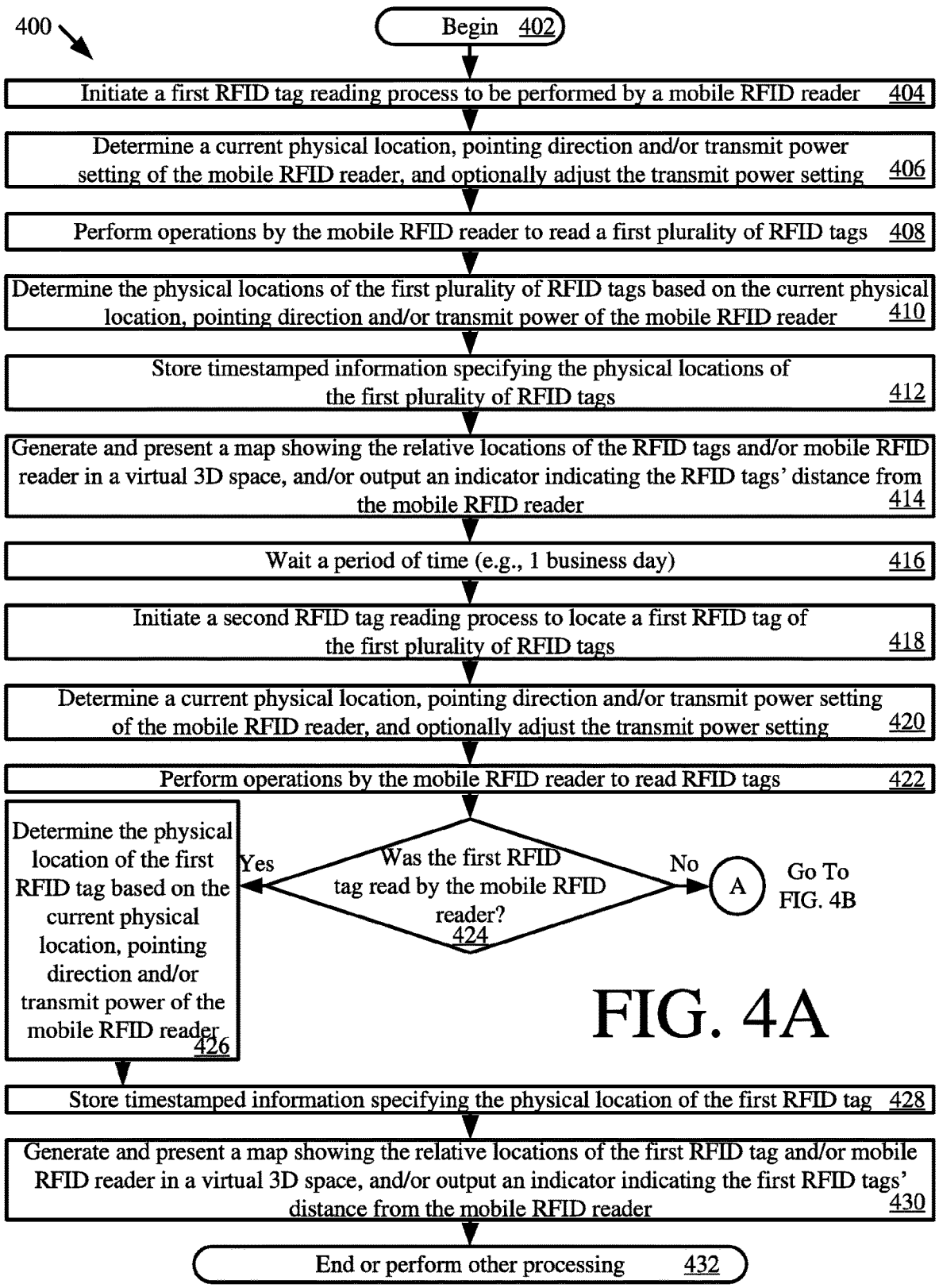
FIGS. 4A-4B (collectively referred to herein as "FIG. 4") provide a flow diagram of an illustrative method for locating an RFID tag which is unreadable by a mobile RFID reader.

Referring now to FIG. 4, there is provided a flow diagram of an illustrative method 400 for determining the locations of RFID tags (e.g., RFID tags $112_1, \ldots, 112_N, 118_1, \ldots, 118_N$ of FIG. 1) which are unreadable by a mobile RFID reader (e.g., handheld RFID reader 120 of FIG. 1) (e.g., because it is close to an obstacle or placed under other items). The mobile RFID reader is carried by or coupled to equipment and/or individuals moving around a facility (e.g., RSF 128 of FIG. 1). For example, the mobile RFID reader is coupled to shopping carts, cleaning equipment, or an individual (e.g., employee 122 of FIG. 1). Alternatively, the mobile RFID reader comprises a handheld RFID reader carried by the individual.

As shown in FIG. 4, method 400 begins with 402 and continues with 404 where a first RFID tag reading process is initiated. The first RFID tag reading process is to be performed by the mobile RFID reader, and therefore is initiated via a user-software interaction with the mobile RFID reader. For example, a user of the mobile RFID reader (e.g., employee 122 of FIG. 1) depresses a button to initiate the first RFID tag reading process or performs a user-software interaction for selecting an option of a drop down menu to initiate the first RFID tag reading process. RFID tag reading processes are well known in the art, and therefore will not be described in detail herein. Any known or to be known RFID tag reading process can be used herein without limitation.

In next 406, the mobile RFID reader performs operations to determine its current physical location, pointing direction and/or transmit power setting. Methods for determining a physical location, pointing direction and/or transmit power setting of a mobile RFID reader are well known in the art, and therefore will not be described in detail herein. Any known or to be known method for determining a physical location, pointing direction and/or transmit power setting of a mobile RFID reader can be used herein without limitation.

In some scenarios, the physical location of the mobile RFID reader is determined using proximity sensors (e.g., sensors $108_1, \ldots, 108_M$ of FIG. 1) disposed within a facility (e.g., RSF 128 of FIG. 1), Time of Flight ("TOF") computations, RSSI determinations, a triangulation algorithm based on signaling information received from beacons (e.g., beacons $106_1, \ldots, 106_M$ of FIG. 1) and/or other wireless network devices disposed within the facility, encoded location data received from fixed infrastructure equipment (e.g., fixed RFID location tags) disposed within the facility, and/or location information generated by a highly accurate location capability thereof (e.g., a Global Positioning System ("GPS") capability). The pointing direction of the mobile RFID reader is determined using internal sensors such as a gyroscope or compass (e.g., sensor(s) 320 of FIG. 3). The transmit power setting is determined by accessing configuration data stored in an internal memory (e.g., memory 304 of FIG. 3) of the mobile RFID reader. The present solution is not limited to the particulars of this scenario.

The transmit power setting may be adjusted in 406 so as to facilitate the generation of a map showing physical locations of RFID tags present within the facility with a fine level of accuracy (e.g., ≤1-20 feet). For example, the transmit power setting is varied based on the determined physical location of the mobile RFID reader and/or configuration rules/logic algorithms/parameters for the geographic zone in which the mobile RFID reader currently resides.

Upon completing 406, 408 is performed where the mobile RFID reader reads a first plurality of RFID tags (e.g., RFID tags $112_1, \ldots, 112_N$ of FIG. 1). The physical locations of the first plurality of RFID tags are determined in 410 based on the current physical location, pointing direction and/or transmit power of the mobile RFID reader. For example, the physical location of each RFID tag is set to the same physical location of the mobile RFID reader, and/or set to a physical location offset from the physical location of the mobile RFID reader. The amount of offset is determined based on Field Of View ("FOV") at least partially defined by the transmit power of the mobile RFID reader, the pointing direction of the mobile RFID reader, and/or RSSI of a signal received from the RFID tag. The present solution is not limited to the particulars of this example.

Timestamped information is stored in 412 that specifies the physical locations of the first plurality of RFID tags. A map is generated and presented in 414. The timestamped information can be stored locally (e.g., in memory 304 of FIG. 3) or remotely (e.g., in data store 126 of FIG. 1). The map shows the relative locations of the RFID tags and/or mobile RFID reader in a virtual 3D space. The map can be presented on a display screen (e.g., output device 316 of FIG. 3) of the mobile RFID reader and/or a display screen of a remote computing device (e.g., server 124 of FIG. 1). Additionally or alternatively, an indicator (e.g., visual, auditory and/or tactile) indicating the RFID tags' distance from the mobile RFID reader is output in 414. The indicator may comprise a Geiger counter based indicator (e.g., output device 316 of FIG. 3).

Subsequently in 416-418, the user of the mobile RFID reader waits a period of time (e.g., 1 business day), and then initiates a second RFID tag reading process to locate a first RFID tag (e.g., RFID tag $112_1$ of FIG. 1) of the first plurality of RFID tags (e.g., RFID tags $112_1, \ldots, 112_N$ of FIG. 1). The second RFID tag reading process is initiated in the same or similar way as the first RFID tag reading process. Next in 420, the current physical location, pointing direction and/or transmit power setting are determined. The transmit power setting may optionally be adjusted in 420 in the manner discussed above. Upon completing 420, the mobile RFID reader performs operations to read RFID tags as shown by 422.

If the first RFID tag was read by the mobile RFID reader [424:YES], then 426-430 are performed. 426-430 involve: determining the physical location of the first RFID tag based on the current physical location, pointing direction and/or transmit power of the mobile RFID reader; storing timestamped information specifying the physical location of the first RFID tag; generating a map showing the relative locations of the first RFID tag and/or the mobile RFID reader in a virtual 3D space; and/or output an indicator indicating the RFID tags' distance from the mobile RFID reader. Subsequently, 432 is performed where method 400 ends or other processing is performed.

Figure 4B:
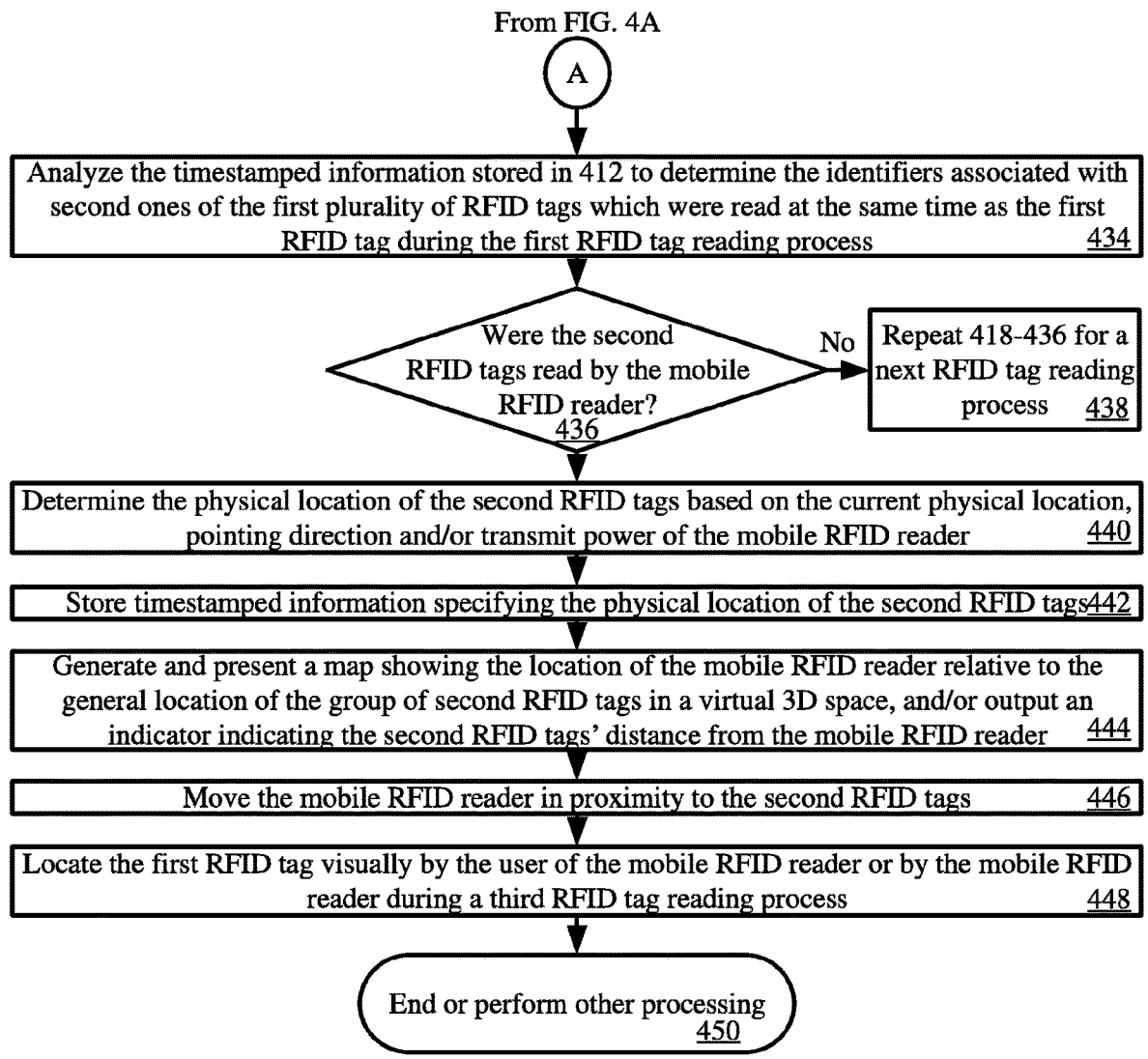

If the first RFID tag was not read by the mobile RFID reader [424:NO], then method 400 continues with 434 of FIG. 4B. 434 involves analyzing the timestamped information stored in 412 to determine the identifiers associated with second RFID tags (e.g., RFID tags $112_2, \ldots, 112_N$ of FIG. 1) of the first plurality of RFID tags (e.g., RFID tags $112_1, \ldots, 112_N$ of FIG. 1) which were read at the same time as the first RFID tag (e.g., RFID tag $112_1$ of FIG. 1) during the first RFID tag reading process. Next, a determination is made as to whether the second RFID tags were read by the mobile RFID reader during the second RFID tag reading process. If not [436:NO], 418-436 are repeated for a next RFID tag reading process, as shown by 438. If so [436:YES], then 440-448 are performed.

440-444 involve: determining the physical location of the second RFID tags based on the current physical location, pointing direction and/or transmit power of the mobile RFID reader; storing timestamped information specifying the physical locations of the second RFID tags; generating a map showing the location of the mobile RFID reader relative to the general location of the group of second RFID tags in a virtual 3D space; present the map on a display screen of the mobile RFID reader and/or remote computing device; and/or output an indicator (e.g., visual, auditory and/or tactile)

indicating the second RFID tags' distance from the mobile RFID reader. The indicator may comprises a Geiger counter based indicator.

The mobile RFID reader is then moved in proximity to the second RFID tags, as shown by 446. At this time, the first RFID tag is visually located by the user of the mobile RFID reader or is located by the mobile RFID reader via a third RFID tag reading process, as shown by 448. Subsequently, 450 is performed where method 400 ends or other processing is performed (e.g., return to 404 of FIG. 4A).

Figure 5:
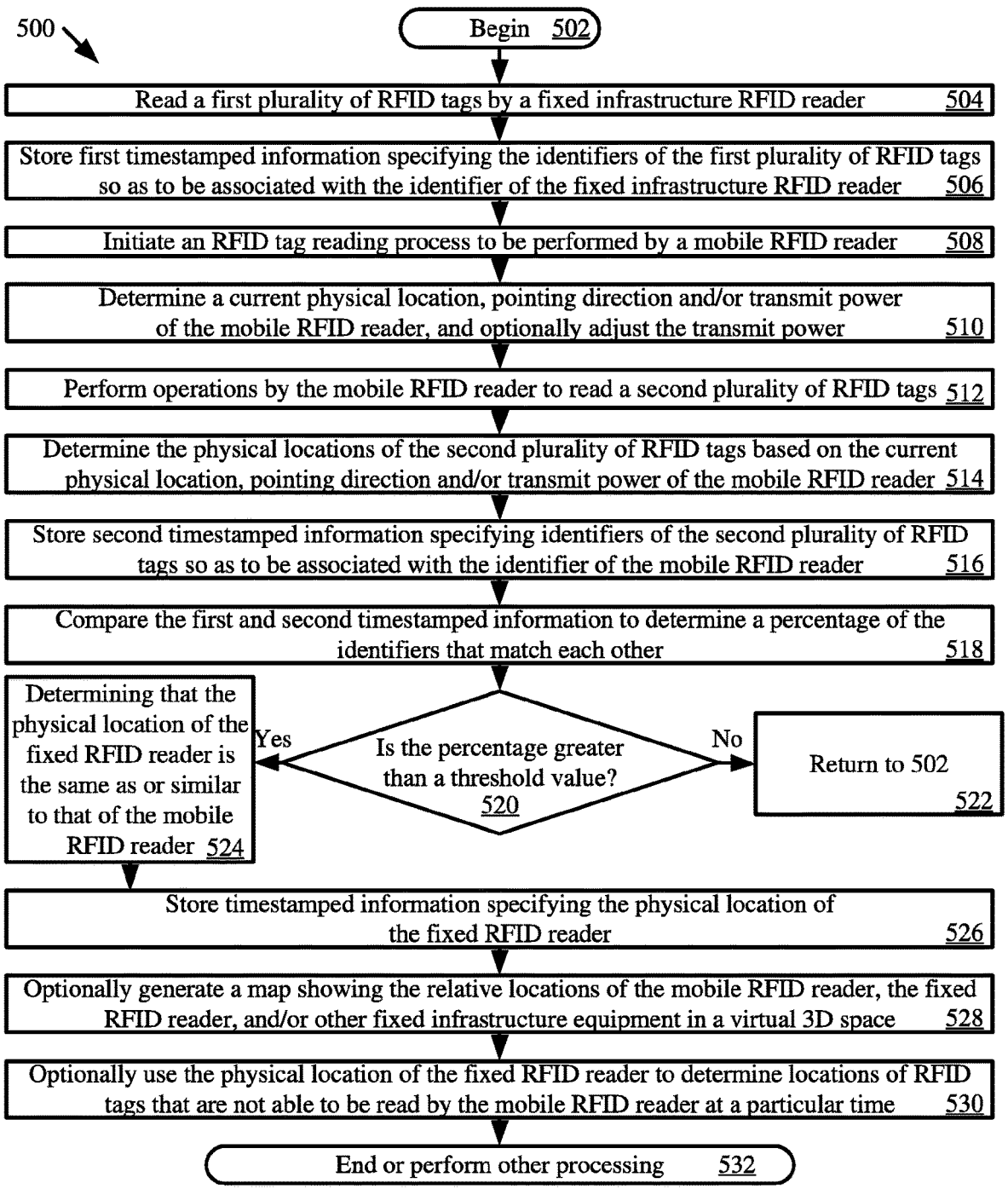
FIG. 5 is a flow diagram of an illustrative method for auto-mapping locations of fixed infrastructure equipment.

Referring now to FIG. 5, there is provided a flow diagram of an illustrative method 500 for auto-mapping locations of fixed infrastructure equipment (e.g., RFID readers $104_1, \ldots, 104_M$, beacons $106_1, \ldots, 106_M$, and/or sensors $108_1, \ldots, 108_M$ of FIG. 1). Method 500 provides systems (e.g., system 100 of FIG. 1) that are less costly and simpler to install as compared to conventional inventorying systems, as well as less prone to human errors. The fixed infrastructure equipment can include, but is not limited to, fixed RFID readers, fixed reference tags, beacons, and/or sensors (e.g., proximity sensors). The auto-mapping is achieved by performing the operations of 504-518. 504-518 involve: reading a first plurality of RFID tags (e.g., RFID tags $112_1, \ldots, 112_N$ of FIG. 1) by a fixed infrastructure RFID reader (e.g., RFID reader $104_1$ of FIG. 1); storing first timestamped information specifying the identifiers of the first plurality of RFID tags so as to be associated with the identifier of the fixed infrastructure RFID reader; initiating an RFID tag reading process to be performed by a mobile RFID reader (e.g., handheld reader 120 of FIG. 1); determining a current physical location, pointing direction and/or transmit power of the mobile RFID reader; optionally adjusting the transmit power of the mobile RFID reader; performing operations by the mobile RFID reader to read a second plurality of RFID tags (e.g., RFID tags $112_1, \ldots, 112_N, 118_1, \ldots,$ and/or $118_N$ of FIG. 1); determining the physical locations of the second plurality of RFID tags based on the current physical location, pointing direction and/or transmit power of the mobile RFID reader; storing second timestamped information specifying identifiers of the second plurality of RFID tags so as to be associated with the identifier of the mobile RFID reader; and/or comparing the first and second timestamped information to determine a percentage of identifiers that match each other.

If the percentage is less than the threshold value [520:NO], then 522 is performed where method 500 returns to 502. If the percentage is greater than a threshold value (e.g., 75%) [520:YES], then 524-526 are performed where: the physical location of the fixed RFID reader is determined to be the same as or similar to that of the mobile RFID reader; timestamped information is stored that specifies the physical location of the fixed RFID reader. A map may be optionally generated in 528. The map shows the relative locations of the mobile RFID reader, the fixed RFID reader and/or other fixed infrastructure equipment in virtual 3D space. The map may also be presented on a display screen (e.g., output device 316 of FIG. 3) of the mobile RFID reader and/or remote computing device (e.g., server 124 of FIG. 1). In a next 530, the physical location of the fixed RFID reader is optionally used to determine locations of RFID tags that are not able to be read by the mobile RFID reader at a particular time. Subsequently, 532 is performed where method 500 ends or other processing is performed (e.g., return to 504).

Figure 6:
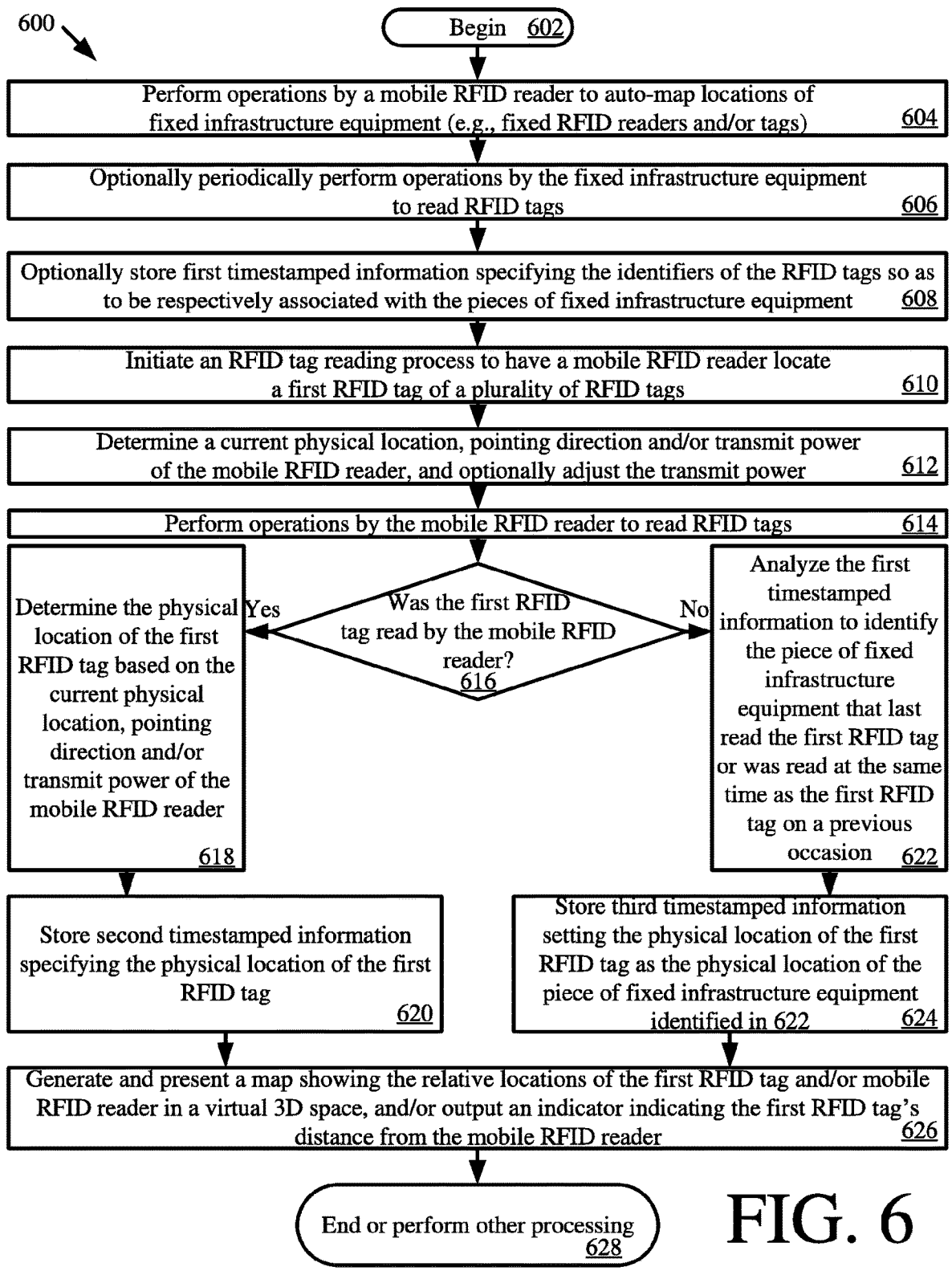
FIG. 6 provides a flow diagram of another illustrative method for locating an RFID tag which is unreadable by a mobile RFID reader.

Referring now to FIG. 6, there is provided a flow diagram of a method 600 for determining the location of an RFID tag (e.g., RFID tag $112_1$ of FIG. 1) which is unreadable by a mobile RFID reader (e.g., handheld reader 120 of FIG. 1). Method 600 begins with 602 and continues with 604 where the mobile RFID reader perform operations to auto-map locations of fixed infrastructure equipment. These operations are the same as or similar to those discussed above in relation to FIG. 5. The fixed infrastructure equipment may optionally periodically perform operations to read RFID tags and store timestamped information specifying the identifiers of the RFID tags read thereby, as shown by 606-608.

In a next 610, an RFID tag reading process is initiated for causing the mobile RFID reader to locate a first RFID tag (e.g., RFID tag $112_1$ of FIG. 1) of a plurality of RFID tags (e.g., RFID tags $112_1, \ldots, 112_N, 118_1, \ldots, 118_N$ of FIG. 1) within a facility (e.g., RSF 128 of FIG. 1). In response, 612 is performed where the current physical location, pointing direction and/or transmit power of the mobile RFID reader are determined. The transmit power may optionally be adjusted at this time. Thereafter, the mobile RFID reader performs operations in 614 to read RFID tags. If the first RFID tag was read by the mobile RFID reader [616:YES], then 618-620 are performed where: the physical location of the first RFID tag is determined based on the current physical location, pointing direction and/or transmit power of the mobile RFID reader; and/or second timestamped information is stored that specifies the previously determined physical location of the first RFID tag. In contrast, if the first RFID tag was not read by the mobile RFID reader [616:NO], then 622-724 are performed where: the first timestamped information is analyzed to identify the piece of fixed infrastructure equipment (e.g., RFID reader $104_1$ of FIG. 1) that last read the first RFID tag or to identify the piece of fixed infrastructure equipment (e.g., a location tag) was read at the same time as the first RFID tag; and/or third timestamped information is stored that sets the physical location of the first RFID tag as the physical location of the piece of fixed infrastructure equipment identified in 622.

Upon completing 620 or 624, a map is generated as shown by 626. The map shows the relative locations of the first RFID tag and/or mobile RFID reader in a virtual 3D space. The map may be presented on a display screen of the mobile RFID reader and/or a remote computing device. Additionally or alternatively, an indicator is output indicating the first RFID tag's distance from the mobile RFID reader. Subsequently, 628 is performed where method 600 ends or other processing is performed.

Figure 7:
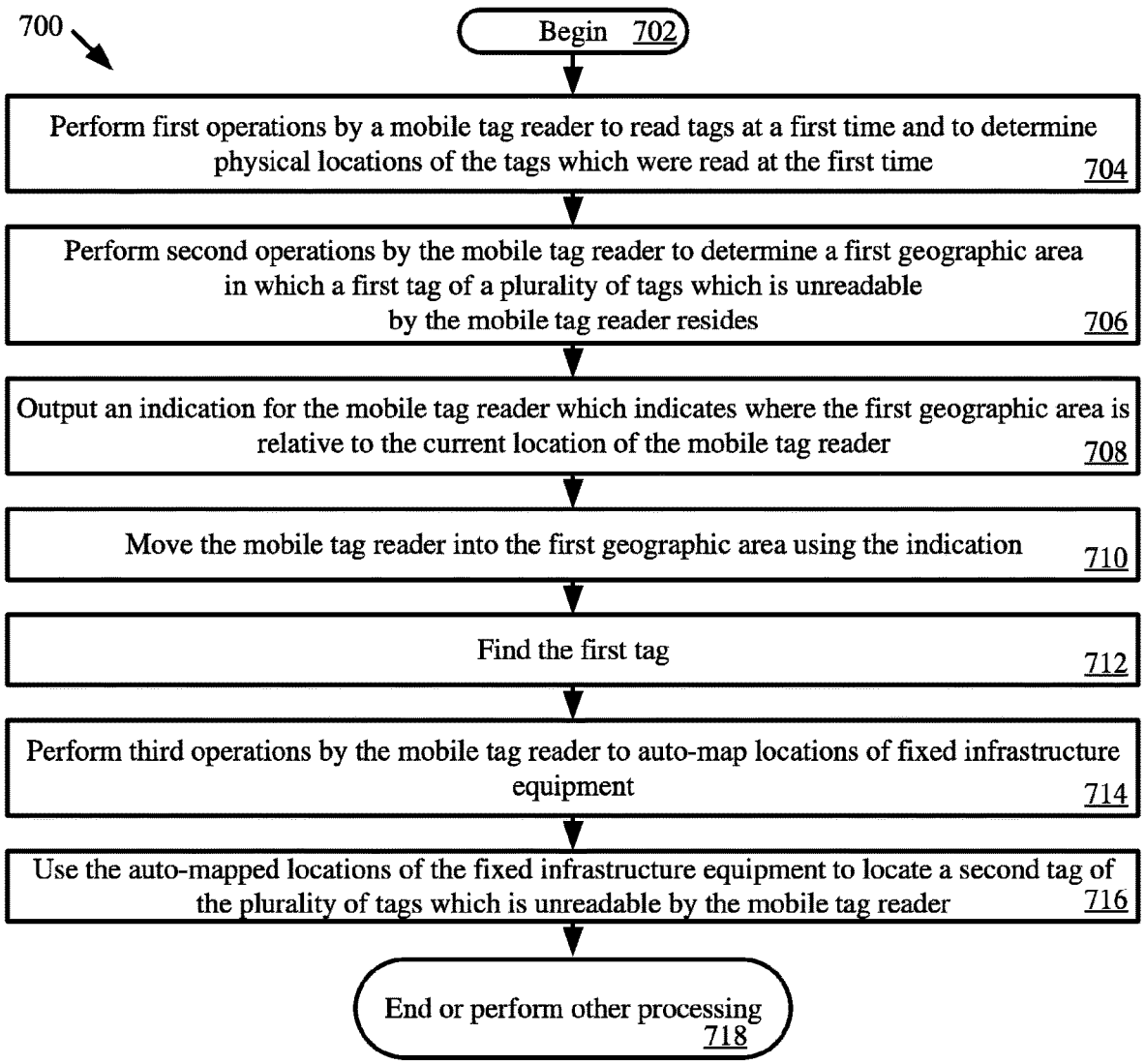
FIG. 7 provides a flow diagram of an illustrative method for finding tags of a plurality of tags which are unreadable by a mobile tag reader at a particular time.

Referring now to FIG. 7, there is provided a flow diagram of an illustrative method 700 for finding tags of a plurality of tags (e.g., RFID tags $112_1, \ldots, 112_N, 118_1, \ldots, 118_N$ of FIG. 1) which are unreadable by a mobile tag reader (e.g., handheld reader 120 of FIG. 1) at a particular time. Method 700 begins with 702 and continues with 704 where the mobile tag reader performs first operations to read tags at a first time and to determine physical locations of the tags which were read at the first time. In some scenarios, the physical locations of the tags are determined based on at least one of a physical location, a pointing direction and a transmit power of the mobile tag reader at the time of performing the first operations. The transmit power of the mobile tag reader may be adjusted prior to performing or at the start of the first operations based on a physical location of the mobile tag reader.

At a second later time, the mobile tag reader performs second operations in 706 for determining a first geographic area in which a first tag of the plurality of tags which is unreadable by a mobile tag reader resides. The second operations involve: analyzing tag read data associated with the first operations to identify second tags of the plurality of tags which were read along with the first tag on a previous occasion; and selecting the first geographic area to comprise a second geographic area defined by the physical locations of the second tags which were determined during the first operations by the mobile tag reader.

Next in 708, an indication is output from the mobile tag reader. The indication indicates where the first geographic area is relative to the current location of the mobile tag reader. The indication includes, but is not limited to, a Geiger counter indication and/or a map showing where the first geographic area is relative to the current locations of the mobile tag reader in a visual 3D space. The mobile tag reader is then moved into the first geographic area using the indication, as shown by 710. In 712, the first tag is visually found by an individual using the mobile tag reader, automatically visually found by a mobile tag reader (e.g., a ground or aerial robotic tag reader) having a camera and image processing capability, and/or automatically found by performing third operations by the mobile tag reader to read tags.

Thereafter, method 700 continues with 714 where the mobile tag reader performs third operations to auto-map locations of fixed infrastructure equipment. The auto-mapped locations of the fixed infrastructure equipment are used in 716 to locate a second tag of the plurality of tags which is unreadable by the mobile tag reader. The second tag is located by identifying a piece of fixed infrastructure equipment that last read the second tag or was read at the same time as the second tag on a prior occasion. Subsequently, 718 is performed where method 700 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for finding tags of a plurality of tags which are unreadable at a particular time, comprising:
    performing first operations by a first mobile lag reader to read tags at a first time and to determine physical locations of the tags which were read at the first time; and
    performing second operations by the first mobile tag reader or a second mobile tag reader at a second later time for determining a first geographic area in which a first tag of the plurality of tags which is unreadable resides, the second operations comprising:
        analyzing tag read data associated with the first operations to identify second tags of the plurality of tags which were read along with the first tag on a previous occasion;
        selecting the first geographic area to comprise a second geographic area defined by the physical locations of the second tags which were determined during the first operations by the first mobile tag reader; and
        outputting an indication from the first or second mobile tag reader which indicates where the first geographic area is relative to the current location of the first or second mobile tag reader.

2. The method according to claim 1, wherein the physical locations of the tags are determined based on at least one of a physical location, a pointing direction and a transmit power of the first mobile tag reader at the time of performing the first operations.

3. The method according to claim 1, wherein a transmit power of the first mobile tag reader is adjusted prior to performing the first operations based on a physical location of the first mobile tag reader.

4. The method according to claim 1, wherein the indication comprises a Geiger counter indication or a map showing where the first geographic area is relative to the current location of the first or second mobile tag reader in a visual 3D space.

5. The method according to claim 1, further comprising moving the first or second mobile tag reader into the first geographic area using the indication.

6. The method according to claim 5, further comprising finding the first tag visually by an individual using the first or second mobile tag reader, visually by the first or second mobile tag reader having an image capture and processing capability, or by performing third operations by the first or second mobile tag reader to read tags.

7. The method according to claim 1, further comprising performing third operations by the first or second mobile tag reader to auto-map locations of fixed infrastructure equipment.

8. The method according to claim 5, further comprising using the auto-mapped locations of the fixed infrastructure equipment to locate a second tag of the plurality of tags which is unreadable by the first or second mobile tag reader.

9. The method according to claim 8, wherein the second tag is located by identifying a piece of fixed infrastructure equipment that last read the second tag or was read at the same time as the second tag on a prior occasion.

10. A system, comprising:
    a processor; and
    a non-transitory computer-readable storage medium comprising programming instructions that are configured to cause the processor to implement a method for finding tags of a plurality of tags which are unreadable by a mobile tag reader at a particular time, wherein the programming instructions comprise instructions to:
    perform first operations to read tags at a first time and to determine physical locations of the tags which were read at the first time; and
    perform second operations at a second later time for determining a first geographic area in which a first tag of the plurality of tags which is unreadable by the mobile tag reader resides, the second operations comprising:
        analyzing tag read data associated with the first operations to identify second tags of the plurality of tags which were read along with the first tag on a previous occasion; and selecting the first geographic area to comprise a second geographic area defined by the physical locations of the second tags which were determined during the first operations and outputting an indication from the first or second mobile tag reader which indicates where the first geographic area is relative to the current location of the first or second mobile tag reader.

11. The system according to claim 10, wherein the physical locations of the tags are determined based on at least one of a physical location, a pointing direction and a transmit power of the mobile tag reader at the time of performing the first operations.

12. The system according to claim 10, wherein a transmit power of the mobile tag reader is adjusted prior to performing the first operations based on a physical location of the mobile tag reader.

13. The system according to claim 10, wherein the indication comprises a Geiger counter indication or a map showing where the first geographic area is relative to the current locations of the mobile tag reader in a visual 3D space.

14. The system according to claim 10, wherein the mobile tag reader is moved into the first geographic area using the indication.

15. The system according to claim 14, wherein the first tag is visually found by an individual using the mobile tag reader, automatically visually found by the mobile tag reader having an image capture and processing capability, or automatically found by performing third operations by the mobile tag reader to read tags.

16. The system according to claim 10, wherein the programming instructions further comprise instructions to auto-map locations of fixed infrastructure equipment.

17. The system according to claim 14, wherein the programming instructions further comprise instructions to use the auto-mapped locations of the fixed infrastructure equipment to locate a second tag of the plurality of tags which is unreadable by the mobile tag reader.

18. The system according to claim 17, wherein the second tag is located by identifying a piece of fixed infrastructure equipment that last read the second tag or was read at the same time as the second tag on a prior occasion.

19. A method for finding tags of a plurality of tags which are unreadable at a particular time, comprising:

performing first operations by a first mobile lag reader to read tags at a first time and to determine physical locations of the tags which were read at the first time; and performing second operations by the first mobile tag reader or a second mobile tag reader at a second later time for determining a first geographic area in which a first tag of the plurality of tags which is unreadable resides, the second operations comprising:

analyzing tag read data associated with the first operations to identify second tags of the plurality of tags which were read along with the first tag on a previous occasion; and selecting the first geographic area to comprise a second geographic area defined by the physical locations of the second tags which were determined during the first operations by the first mobile tag reader, wherein a transmit power of the first mobile tag reader is adjusted prior to performing the first operations based on a physical location of the first mobile tag reader.

* * * * *